March 26, 1929.  A. J. KUSEL ET AL  1,706,890
THERMAL CONTROL DEVICE
Filed March 17, 1927   2 Sheets-Sheet 1

Abraham J. Kusel
George W. Bail        INVENTORS
BY
R. Clyde Cruit
ATTORNEY.

March 26, 1929. A. J. KUSEL ET AL 1,706,890
THERMAL CONTROL DEVICE
Filed March 17, 1927  2 Sheets-Sheet 2

Abraham J. Kusel
George W. Gail, Inventors
By [signature], Attorney

Patented Mar. 26, 1929.

1,706,890

UNITED STATES PATENT OFFICE.

ABRAHAM J. KUSEL, OF BRIDGEPORT, CONNECTICUT, AND GEORGE W. GAIL, OF RUXTON, MARYLAND, ASSIGNORS TO KULAIR CORPORATION, OF BALTIMORE, MARYLAND, A CORPORATION OF DELAWARE.

THERMAL CONTROL DEVICE.

Application filed March 17, 1927. Serial No. 176,122.

This invention relates to certain improvements in thermostatically controlled circuit makers and breakers and particularly to an improved device of this character, developed primarily to meet the demands and conditions in domestic automatic electric refrigeration, although of course, the invention is applicable to many other uses where it is desired to thermostatically control electric circuits.

One of the well known types of thermostatic devices in present use, in connection with electric refrigerating machines, is the mercury tube switch, adapted to be oscillated or rocked to make and break the circuit upon the expansion and contraction of a thermal coil, according to the fluctuations of the temperature, whereby the operating mechanism of the refrigerating machine is started and stopped responsive to the changes in temperature within certain predetermined limits.

These devices, to be efficient, must be capable of quick, accurate and responsive action, and after the device has been properly set it should only require a change of a few degrees in temperature to cause the same to function, and therefore only a slight movement to rock the mercury tube from on to off position and vice versa.

It is also necessary that the mercury tube switch be protected against all collateral conditions or movements other than that of the thermostatic element, and the object of the present invention is the provision of a device of the character indicated answering all of these requirements.

Ordinarily where a mercury tube switch is combined with a thermal coil, the said tube is supported by the inner end of the thermal coil, with the undesirable result that any jarring or vibrations will oftentimes cause the switch to function when not necessary or desired.

Another undesirable feature of the devices now in use is that in these prior constructions it is impossible to properly adjust the thermal coil to any great or positive degree owing to the fact that the inner end of the coil is in reality free.

Furthermore where the mercury tube is supported by the inner or free end of the thermal coil, any attempt to tension or adjust the coil will only result in tilting the mercury tube to a more or less degree. In other words instead of confining the adjustment wholly within the coil, the adjustment is transmitted to the mercury tube and is dependent upon the angle of said mercury tube and the amount of pitch to be overcome by the coil, which results in a very slow and inaccurate functioning of the device, and when used in connection with electric refrigeration causes a delay in starting the motor operating the same and also a delay in stopping said motor and thus a loss in efficiency of operation and making it impossible to maintain the much desired uniformity of temperature in the refrigerator compartment.

In the operation of applicant's improved device, there is a quick snap action and irrespective of the setting of the same, the mercury tube is always in position to make or break the circuit upon a slight movement from the horizontal in either direction, the snap action preventing the possibility of arcing.

This is accomplished by mounting the thermal coil, with respect to the mercury tube switch, so that said coil can be adjusted to any degree without in any way affecting the mercury tube during said adjustments, the mercury tube being positioned independently of the thermal coil and connected thereto by a novel lever arrangement, the whole to function in a manner to be hereinafter described in detail.

Applicant is aware that it is also old in the prior art to mount the switch device independently of the thermal coil, but in these instances usually, an arm is secured to one end of the thermal coil to be moved thereby, with the other end of the arm mounted in position to appropriately engage a switch device as said arm is swung or oscillated upon the expansion and contraction of the thermal coil during the operation of the device. These devices, still however, lack means for adjusting the tension of the thermal coil without transmitting this adjustment to the outer end of the arm carried by the thermal coil and it is impossible to put the thermal coil under any substantial degree of tension without throwing or operating the switch device so that these devices are likewise equally deficient as those devices in which the mercury tube switch or switch element is carried directly by the thermal coil.

Although the present improved device will be described particularly with reference to automatic electric refrigerating machines, it is also capable of various modifications within the scope of the invention whereby the same may be adapted for use in connection with apparatus other than an electric refrigerating machine. Some of the preferred modifications are shown in Figures 4 to 8 inclusive in the accompanying drawings, one arrangement providing for the simultaneous control of two different circuits and another an adaptation of the device to circuits carrying currents of increased strength and thus correspondingly increasing the current carrying capacity of the device.

Briefly stated the instant invention comprises a base, supporting independently thereon, the thermal coil and the mercury tube switch, the mercury tube switch being supported for rocking movement on said base and the rocking support being operatively connected to the thermal coil by a compound lever mechanism.

The preferred embodiment of the invention is illustrated in the accompanying drawings in which.

Figure 1:
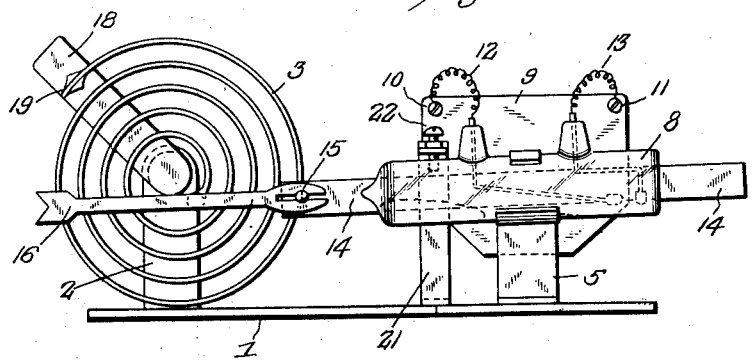
Figure 1 represents one type of apparatus in which the thermal coil is arranged in vertical position and is shown in unwound position.
Figure 2:
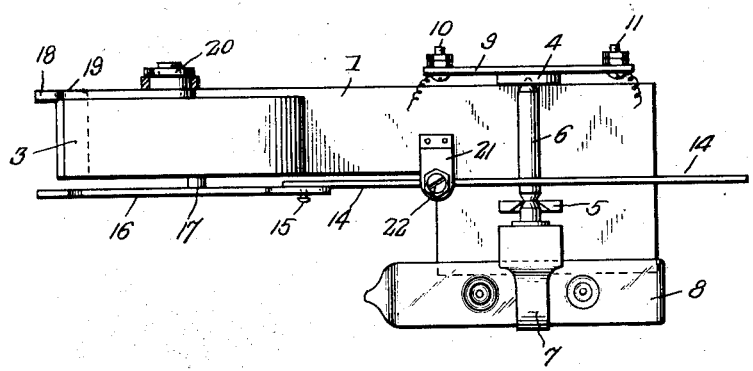
Figure 2 is a top plan view thereof.
Figure 3:
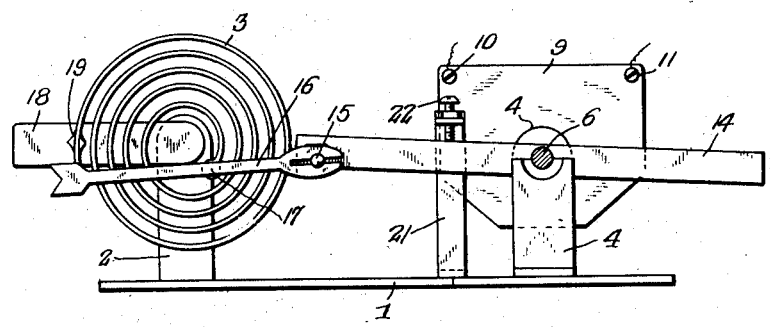
Figure 3 is a view partly in elevation with certain parts removed, showing the thermal coil in wound or adjusted position.

Referring to the drawings in detail, with particular references to Figures 1, 2 and 3 the improved device comprises a base 1 having at one end secured thereto an upstanding support 2 for a thermal coil 3 and at its opposite end upstanding arms 4 and 5 providing bearings for a rockable shaft 6 said shaft carrying at its outer end a U-shaped clamp 7 supporting a mercury tube switch 8 of any well known and preferred type. The support 4 has secured thereto a panel or plate 9 of insulating material, said plate being provided with binding posts 10 and 11 by which the device is connected in the circuit in which the same is to be used. It will of course be obvious that the terminals of the mercury tube switch are provided with the necessary wires forming the proper connections with the binding posts as at 12 and 13.

Rigidly secured to the rockable shaft 6 is a lever arm or the like 14 provided at its inner end with a pivot pin 15 adapted to form a pivotal connection with a lever arm 16 rigidly secured to the inner end of the thermal coil as at 17.

As hereinbefore stated the thermal coil 3 is carried by the upstanding support 2 and this connection is made through an arm 18 secured at 19 to the outer end of the coil, said arm 18 being pivotally and adjustably secured to the upper end of the support 2, the said arm being frictionally held in its various adjustments by a nut or the like 20.

Also mounted upon the base 1 intermediate the support 2 and supports 4 and 5 is a vertically disposed bracket arm 21, provided at its upper end with an adjustable screw or the like 22 forming a stop for the upward movement of the lever arm 14. This stop 22 is so adjusted that when the lever arm 14 is in contact therewith the mercury tube 8 will be tilted to cause the mercury in said tube to bridge the gap between the contact points and close the circuit. In other words the device will be in the circuit closed position and it will only require a slight downward movement of the lever arm 14 to tip the mercury tube sufficiently to break the circuit. With this in mind it will be apparent that the rocking of the mercury tube to break the circuit will be dependent upon the amount of tension that is put upon the thermal coil 3 beyond the point where the lever arm 14 is in engagement with the stop 22, so that in operation the change of temperature necessary will have to be more, or less, dependent upon the tension adjustment of the thermal coil, the stop 22 forming a means whereby the inner end of the coil is held or anchored so that the coil can be actually wound up to exert the proper tension to be overcome without altering the position of the mercury tube beyond the predetermined limits. By reason of this novel connection the mercury tube switch will not be affected until the proper temperature is reached for which the apparatus is set, at which time the mercury tube switch will be tilted with a quick snap action to break the circuit. Consequently when the circuit is broken immediately, for example, when the refrigerating compartment has reached the desired cooling temperature, it will require only a very slight movement of the thermal coil in the opposite direction to again tilt the tube in the reverse direction to again close the circuit. In other words as distinguished from the prior art hereinbefore discussed, in the present instance the mercury tube switch is not affected or moved by the thermal coil until an instant before the coil has reached its point of expansion or contraction for which it has been set, whereby said mercury tube will remain in either of its two extreme positions until it is quickly snapped over at the proper instant.

By reason of the present construction, the thermal coil can be positively and accurately adjusted to any set position or tension without affecting the mercury tube switch. Moreover the mercury tube switch is securely mounted against vibrations and the like and independently supported with respect to the thermal coil and no movements of said coil are transmitted to the mercury tube switch until the instant prior to the time for its operation thereupon by the thermal coil.

Referring to Figures 4 to 7 inclusive the device therein illustrated is in effect and general arrangement similar to the device as illustrated in Figures 1 to 3 inclusive, differing therefrom with respect to certain modified details. In the device illustrated in Figures 1 to 3 inclusive the thermal coil is arranged in vertical position with respect to the supporting base but in the device as illustrated in Figures 4 to 7 inclusive the thermal coil is arranged in flat or horizontal position, which latter construction has been developed to meet the demands of refrigerator construction or the like where only a small space is available for its installation.

Figure 4:
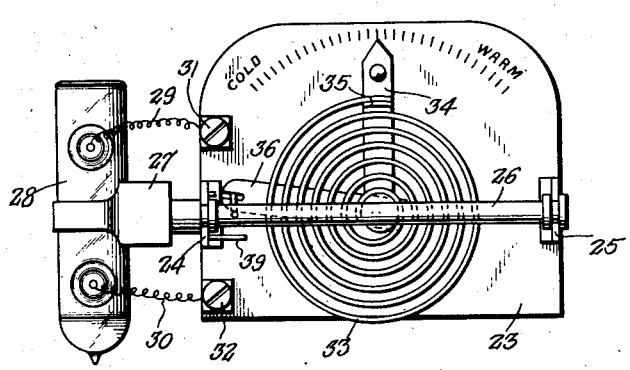
Figure 4 is a top plan view of a modified construction showing the thermal coil in horizontal position.
Figure 5:
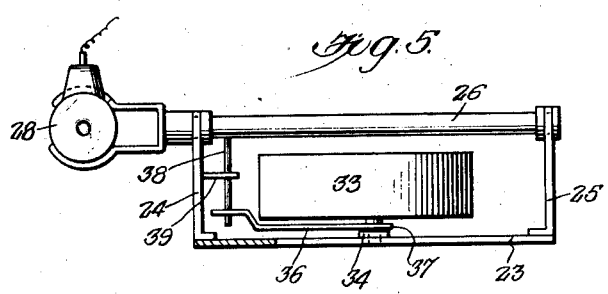
Figure 5 is an end view thereof.
Figure 6:
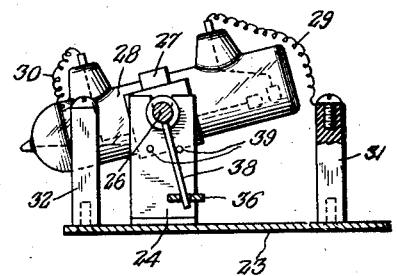
Figure 6 is a transverse view partly in section and partly in elevation more clearly illustrating the means of rocking the mercury tube switch.

In this modified construction there is provided a base 23 having mounted at opposite ends thereof vertically disposed bracket arms 24 and 25 said arms being formed at their upper edges to provide bearings for a horizontally disposed rock-shaft 26 said shaft as shown in Figures 4 and 5 being provided at one end with a support or the like 27 in which is mounted a mercury tube switch 28 said switch being provided with necessary wiring 29 and 30 running to appropriately arranged binding posts 31 and 32 secured to the base 23. Centrally arranged on the base 23 is a thermal coil 33 said coil being pivotally mounted to the base by a radially disposed arm 34 secured at 35 to the outer end of said thermal coil, in a manner similar to that described with respect to the construction as shown in Figures 1 to 3 inclusive. Also similar to the construction as previously described the inner end of the thermal coil 33 has rigidly connected thereto a radially disposed arm 36 the connection of the arm 36 to the inner end of the thermal coil being more clearly shown at 37 in Figure 5. The outer end of this arm 36 is bifurcated or slotted and is adapted to engage a downwardly extending pin or rod 38 secured to the rock-shaft 26. This pin 38 is secured in the rock shaft 26 at a point adjacent the vertically disposed bracket arm 24 in position to engage stops 39 outwardly extending from said vertically disposed bracket arm 24, as the shaft is rocked back and forth during the operation of the device. It is to be understood of course that this rocking movement is caused by the expansion and contraction of the thermal coil which causes an oscillation of the arm 36 and as the outer end of said arm is in engagement with the pin 38 secured to the rock-shaft 26 said shaft will be oscillated or rocked in a corresponding manner, said rocking movements being limited by the stops 39. The mercury tube switch being mounted in a support 27 carried by the shaft 26 is likewise rocked or oscillated in a manner to cause the making and breaking of the circuit under working conditions of the apparatus.

Figure 7:
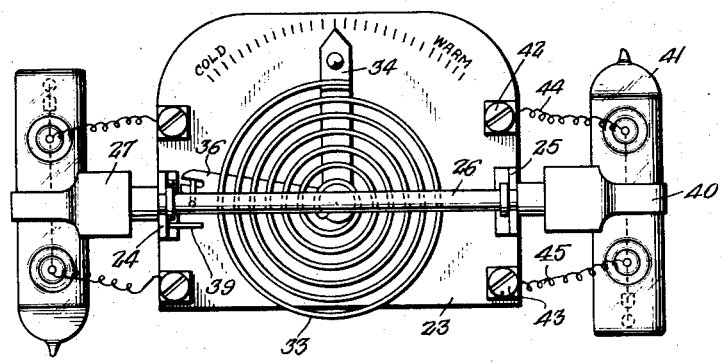
Figure 7 is another modification in which it is proposed to use two mercury tube switches reversely positioned so that two circuits may be controlled simultaneously.

It is of course to be understood that devices of this character are applicable to many uses and in fact all uses where it is desired to control electric circuits by thermal action. It is also desirable at times to control two distinct circuits and in this connection where it is desired to break one circuit and close another, the device as illustrated in Figure 7 of the drawings will accomplish this result. In this disclosure the operating mechanism is the same as that described in Figures 1 to 6 inclusive, the only change being that the shaft 26 is extended beyond the vertically disposed supporting bracket arm 25 and the extension provided with an additional support 40 for carrying a second mercury tube switch 41 necessitating of course two additional binding posts 42 and 43 for the wiring 44 and 45 connecting the terminal points of the switch with said binding posts. In this construction the mercury tube switches are reversely arranged to each other so that upon the rocking of the shaft 26 one circuit will be broken and the other closed.

Figure 8:
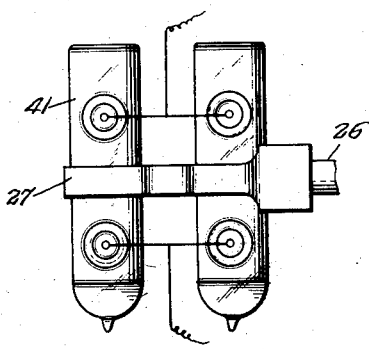
Figure 8 is a detailed view illustrating a means of adapting the device to currents of increased strength, illustrating for example two mercury tube switches wired in parallel.

It is well known in the art that mercury tube switches of a certain size can only carry a current of a certain voltage any current of increased strength causing an arcing between the terminal points within the tube and resulting in an exploding or destruction of said tube. Where it is desired to use a device of this character with currents of increased strength it is proposed in the present instance to mount two or more mercury tube switches on the rock shaft 26 said tube switches to be wired in parallel, the number of tube switches being dependent upon the strength of current in connection with which the device is to be used. This modified construction is clearly shown in Figure 8 of the drawings.

What I claim is:

1. In a control device of the thermal type, the combination with an electrical switch element, of a thermal coil, a pivoted lever connection between said coil and switch element and positive means for limiting the movements of said lever connection.

2. In a control device of the thermal type, the combination with an electrical switch element, of a thermal coil, a pivoted lever connection between said coil and switch element and a stop to limit the movement of said lever connection.

3. In a control device of the thermal type, the combination with an electrical switch element, of a thermal coil, a pivoted lever connection between said coil and switch element and means for limiting the movement of said lever connection in the direction of the tension of the thermal coil.

4. In a control device of the thermal type, the combination with an electrical switch element, of a thermal coil, means for increasing or decreasing the tension of said coil, a pivoted lever connection between said coil and switch element and means to limit the movements of said lever connection in the direction of the tension of the thermal coil.

5. In a control device of the thermal type, the combination with a mercury tube switch, of a rockable support therefor, a thermal coil and a pivoted lever connection between said coil and rockable support.

6. In a control device of the thermal type, the combination with a mercury tube switch, of a rockable support therefor, a thermal coil, a pivoted lever connection between said coil and support and a stop to limit the movements of said lever connection.

7. In a control device of the thermal type, the combination with a mercury tube switch, of a rockable support therefor, a thermal coil, means for increasing or decreasing the tension of said coil, a pivoted lever connection between said coil and support and a stop to limit the movement of said lever connection in the direction of the tension of the thermal coil.

8. In a control device of the thermal type, the combination with a supporting base, of a rockable mercury tube switch, a thermal coil, a pivoted lever connection between said coil and switch, a support carried by the base for said thermal coil and means for adjustably securing the coil, to said support, under tension.

9. In a control device of the thermal type, the combination with a supporting base, of a rockable mercury tube switch, a thermal coil, a pivoted lever connection between said coil and switch, a support carried by the base for said thermal coil, an arm connected to the outer end of said coil for adjustably securing the coil, to said support, under tension.

10. In a control device of the thermal type, the combination with a supporting base, of a rockable mercury tube switch, a thermal coil, an operative connection between said coil and switch, a support carried by the base of said thermal coil, a radially disposed arm rigidly connected to the outer end of said coil and having its inner end rotatably secured to said support for winding and unwinding said coil.

11. In a control device of the thermal type, the combination with a supporting base, of a mercury tube switch, a rockable support therefor, an arm carried by said rockable support, a thermal coil, an arm secured to the inner end of said coil and a pivotal connection between the outer ends of said arms.

12. In a control device of the thermal type, the combination with a supporting base, of a mercury tube switch, a rockable support therefor, an arm carried by said rockable support, a thermal coil, an arm secured to the inner end of said coil, a pivotal connection between the outer ends of said arms and a stop to limit the upward movements of the arms.

13. In a control device of the thermal type, the combination with a supporting base, of a mercury tube switch, a rockable support therefor, an arm carried by said rockable support, a thermal coil, a support carried by the base for said thermal coil, a radially disposed arm rigidly connected to the outer end of the coil and having its inner end rotatably secured to said support, an arm secured to the inner end of said coil, a pivotal connection between the outer ends of said first and last mentioned arms, a stop to limit the upward movements of said pivoted arms, whereby the inner end of the coil may be held and the supporting arm for said coil rotated to properly tension the coil.

14. In a control device of the thermal type, the combination with a thermal coil, of a rockable support, means for mounting a multiplicity of switch devices on said support and a pivoted connection between said thermal coil and rockable support.

15. In a control device of the thermal type, the combination with a thermal coil, of a rockable support, means for mounting a multiplicity of mercury tube switches on said support and a pivoted lever connection between said thermal coil and rockable support.

16. In a control device of the thermal type, the combination with a thermal coil, of a rockable support, means for mounting a multiplicity of independently wired mercury tube switches on said support and a pivoted lever connection between said thermal coil and rockable support.

17. In a control device of the thermal type, the combination with a thermal coil, of a rockable support, means for mounting a multiplicity of mercury tube switches, wired in parallel, on said support and a pivoted lever connection between said thermal coil and rockable support.

18. In a control device of the thermal type, the combination with a thermal coil, of a rockable support, means for mounting a multiplicity of switch devices on said support, a pivoted connection between said thermal coil and support and means permitting the tensioning of the thermal coil.

In testimony whereof we affix our signatures.

ABRAHAM J. KUSEL.
GEORGE W. GAIL.